Patented Feb. 23, 1926.

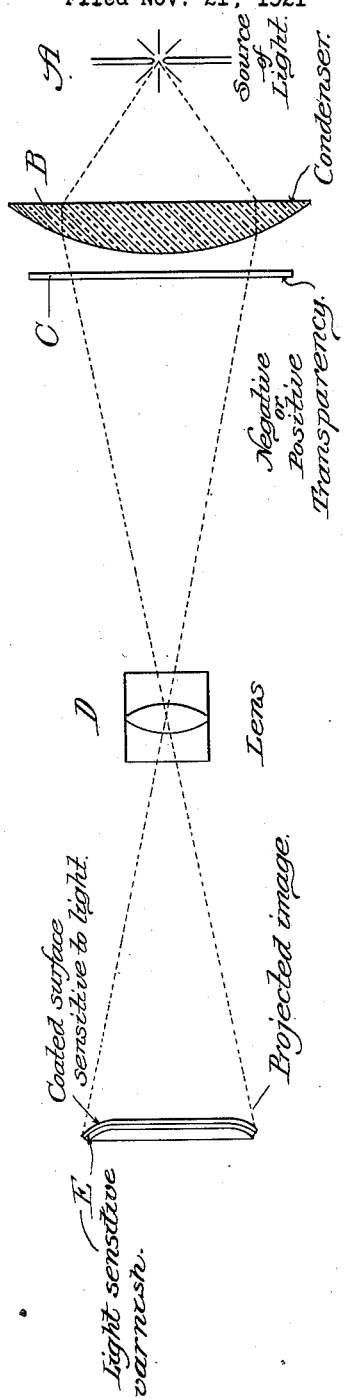

1,574,358

UNITED STATES PATENT OFFICE.

MURRAY C. BEEBE, OF FORT THOMAS, KENTUCKY, ASSIGNOR TO THE WADSWORTH WATCH CASE COMPANY, OF DAYTON, KENTUCKY, A CORPORATION OF KENTUCKY.

PROCESS OF OPTICAL COPYING.

Application filed November 21, 1921. Serial No. 516,865.

*To all whom it may concern:*

Be it known that I, MURRAY C. BEEBE, a citizen of the United States, residing at Fort Thomas, in the county of Campbell and State of Kentucky, have invented certain new and useful Improvements in Processes of Optical Copying, of which the following is a specification.

My invention comprises a process of direct optical copying on metals, etc., and the improved process preferably is practiced by the use of an improved light-sensitive coating, such as is described herein.

The primary object of the invention is to provide a thoroughly practicable process whereby any design, figure, picture, or image of an object, or the like, appearing on a sheet, film, or plate, through which light may be projected or transmitted, may, by optical projection or transmission, produce an image in a light-senstive coating applied to a suitable surface, or foundation, by such a moderate period of exposure as to render the process thoroughly practicable as a means for reproducing any desired figure or design for various industrial purposes.

An exceedingly useful application of the invention, for example, is that of reproducing a design or picture, or the like, on a suitable sensitized coating applied to a metal surface, such as the surface of a watch case, then developing the coating in any suitable way, and employing the developed coating as a resist in an etching operation.

As an illustration, the light-sensitive, slowly drying varnish, hereinafter described, may be applied as a wet coating to a metal surface; an image may be optically projected upon said coating, and the coating may thereby be caused to undergo a change, selectively, in accordance with the varying intensity of the light projected thereon, such change involving a hardening, or setting, of the material of the coating and a change in the solubility thereof in a selective manner; the coating may then be subjected to a developing operation; and, finally, the portion of coating which is retained on the metal surface may be used as a resist in an etching operation. In the process, a negative, or a positive, having transparent and opaque areas, or areas of varying transparency, comprising a design of any desired character, is placed between a source of light and a projecting lens, so as to focus the image on the varnish coating in areas which vary in luminosity, as will be readily understood; and after suitable exposure, portions of the coating are selectively removed by a suitable developing agent, leaving the metal bare or at least subject to acid attack to enable a design to be etched into the metal in a known manner. Thus, for example, the dried on, hardened or insolubilized portions of the coating may be used to protect the underlying surface against a subsequent etching, electroplating, or other material removing or adding step. Or, if desired, the set portions of the coating, forming the design, may be retained on the foundation surface, with or without other related steps.

The manner in which the image may be projected upon the light-sensitive coating is illustrated in the accompanying drawing.

In the drawing, A represents a source of light; B, a lens which may be termed a condenser; C, a transparent plate, film, or sheet which bears thereon the design, picture, or image of the object which is to be projected; D, a lens through which the projected rays of light pass; and E, the surface bearing the light-sensitive coating. The arrangement is such as to properly focus the projected image on the light-sensitive coating, and the coating undergoes a selective change in accordance with the varying intensity of the light projected thereon. Suitable legends are applied to the various parts illustrated in the drawing, so that the method of projection will be readily understood from the drawing.

The description hereinafter given will enable the invention to be understood, but it is not intended thereby to limit the invention to specific details.

In practically carrying out an adaptation of the invention which involves direct optical copying on metals, etc., it is preferred to employ a lantern-slide transparency, positive or negative, which may be a copy of any desired design or subject, in line or half-tone. Thus, such a transparency is designated C in the drawing. The image is projected upon the receiving surface, enlarged, reduced, or of the same size, as may be desired, in a known manner.

The receiving surface may be, for example, a metal plate useful for surface or intaglio printing purposes, such as a watch case, a silver plaque, ceramic tablet, or a piece of glass ware. The receiving surface is coated with a spontaneously drying light-sensitive varnish, preferably comprising a resin, gum or other base, a drying oil, and an accelerating agent, or agents, as hereinafter explained. The varnish is applied wet. For example, it may be dropped upon a whirling surface, and thus be caused to spread itself as a thin coating on the surface, in the manner known in the engraving art. The coating, if subjected to ordinary drying conditions, would dry spontaneously in a certain time, varying according to the degree in which well known driers are present in the varnish.

The surface bearing the coating of varnish, preferably in undried condition, is suitably focused in the optical system and subjected to the action of the light projected on the coating for a suitable period of time. Under the action of the light projected in accordance with the image, the coating exposed to the projected light becomes dry, or set, and strongly adherent to the surface of the object on which the copying is done; and the hardened portion of the coating is rendered insoluble in suitable developing agents. The natural rate of drying of the unlighted parts, or moderately lighted parts, of the wet coating is such that the portions of the coating exposed to no projected light, or to weak light, are not hardened, or set, in such a degree as to enable them to withstand the action of a developing agent which will not remove the set, or hardened, image, and thus these parts of the coating remain soluble in such a developing agent.

When the "image" has been properly formed in the coating by the setting, or hardening, of portions of the coating in accordance with the light projected thereon, the coating is subjected to the action of any suitable developing agent. Thus, a suitable solvent may be applied to the coating with a sponge or tuft of cotton, and thus the portions of the coating which have not become set may be removed, and the set parts will remain adhering to the surface.

The hardened, or set, image may serve as an acid-resist for delicate etchings, etc., without any further treatment, but in case more vigorous action is desired, the "print" may be burned into an enamel in any well known way. In fact, after the coating has been caused to undergo a selective change in accordance with the light projected thereon, the subsequent steps in utilizing the result thus produced may be any of those which are known to the art.

In forming the varnish, it is preferred to employ a suitable resin, Chinawood oil, and an accelerating agent or agents, such as lead resinate and iodine. Other substances adapted to serve as accelerating agents are mentioned below. The proportions may be varied greatly, but it is preferred to employ a drying oil in larger proportion than the resin or other suitable base. The resinate, or other accelerating agent, is employed in small percentage.

A feature of importance in connection with the invention is that in the preferred procedure the varnish remains wet throughout the exposure to the projected rays, except in the area affected by the rays.

This is in marked contrast to existing processes, in which the image receiving surface is ordinarily dry, whether the image be imprinted by direct projection in a copying camera, or by contact printing. In the improved process, the work of developing is readily effected by any of the means known to the art.

The well known processes mentioned above include the use of silver nitrate, silver bromide, potassium bichromate, ammonium bichromate, potassium ferricyanide, the particles of Syrian asphaltum that are insoluble in ether and sulphurized asphalt, etc., as sensitizers.

As an example of the process for forming the light-sensitive varnish, the following may be taken:

| | Grams. |
|---|---|
| Copal | 10 |
| Tungoil | 25 |
| Lead resinate | .5 |
| Turpentine | 15 |

These ingredients may be formed into a varnish in accordance with the general practice employed in varnish making. It is usual, for example, to cook together a resin and a drying oil, and then to add other ingredients such as drying agents, a thinner, or the like. This method may be followed in a general way in producing the light-sensitive varnish. That is, the copal and tungoil may be cooked together until it is of the desired consistency, after which the lead resinate and turpentine may be admixed.

However, as indicated above, the process is broad and important in character; and, in actual practice, wide variations are followed. Up to a point, further additions of tungoil, lead resinate, or manganese resinate, etc., accelerate the drying, as is well known in the ordinary use of these ingredients for paints, etc., from which it is seen that the broad principle of the invention sought to be protected herein resides in projecting or transmitting an image onto a light-sensitive coating having the characteristics described herein, so as to cause the luminous parts to dry or harden rapidly, and in discontinuing the projection before the non-luminous parts have become strongly adherent, thus leaving the unreacted portions of the coating in condition to be removed in the developing operation.

It is important that the drying or hardening action extend entirely through the thickness of the coating, especially at those points where the illumination is strongest, as otherwise the "image" may be washed off in the developing operation. In contrast to the complete drying properties of tungoil, linseed oil dries mainly on the surface, leaving the underside soft for a long time. Thus, a greater length of time is necessary in "fixing" the image if linseed oil is employed, or is present in any considerable proportion in the varnish. In this connection, it has been found that the spontaneous rate of drying of tungoil (Chinawood oil) is about five times greater than linseed oil. After the exposed surface of the metal, for example, has been treated by etching, or otherwise, the hardened image may be removed in any desired manner, as by buffing, or by well known means similar to those used in removing the enamel from photoengravings.

If desired, the hardened varnish may be retained as a permanent image, in which case it may have any desired color incorporated with it; and, also, it may have special ingredients of one kind or another added in order to lend itself to great variety in decoration. Should the coating contain a metallic pigment, it may be placed on china or porcelain and the image burnt in.

In addition to lead resinate, manganese resinate, and iodine, mentioned above, other accelerators may be mentioned, such as metallic oxides, including ferric oxide, manganese dioxide, lead oxide, barium carbonate, zinc oxide, etc. These ingredients may be used in any desired combination. Various other metal salts might be mentioned. While, on account of the very high sensitivity to light possessed by tungoil, it is possible to employ a varnish comprising the tongoil and omitting the accelerating agents, it is greatly preferred to employ the accelerating agents. Some of the accelerating agents mentioned are slower than others. For instance, copper, barium, and iron in the form of metallic resinates ordinarily are insufficient, alone, to transfer enough oxygen to the oil, and hence it is preferred to employ a lead or manganese resinate, and the higher the proportion of the last mentioned substances in the varnish, the greater the drying power becomes.

For the reason stated, special accelerating agents are employed in the preferred practice of the process. It is unnecessary to attempt to state the exact chemical reactions, or the exact nature of the changes which take place in effecting the transformation which "fixes" the coating where it is struck by the illuminated image. It is probable that where iodine, as well as the metal salts, is employed, both an ordinary drying action occurs and also a change in the nature of a chemical change, or a polymerization, occurs.

The tungoil is itself a hydrophobic colloid, and the resonates, or salts, are present in the form of minute particles, in the nature of colloids. These salts, or some of them, combine with the iodine and form iodides, or a metallic halide, and the metallic halide is thus present in the varnish as a colloid. The metallic halides will, under the influence of light, liberate halogen, which is thus free to act as a catalytic agent, and so greatly hasten the hardening of the image. However, the precise nature of the reactions, or changes, which take place need not be specified. Regardless of theory, the practical effect of incorporating the accelerating ingredients is to hasten the drying or hardening of the varnish under the action of the projected light.

Tungoil and linseed oil are examples of the drying oils, but as stated, tungoil is more light-sensitive than linseed oil, and thus the use of tungoil is especially desirable where a very rapid change to the insoluble condition under the action of light is of prime importance. The drying oils contain fatty acids which doubtless are active in the changes which occur in the varnish coating under the action of light. Such action is greatly expedited, moreover, when a metallic halide is dispersed in the varnish, where it can serve as a halogen-liberating colloid.

It is to be understood that the varnish described above is only an example of varnishes which may be used in the process, and that any equivalent varnish may be used without departure from the invention. Resins, or gums, ordinarily are not greatly sensitive to the action of light. Thus, the copal resin mentioned above is used largely to give body to the varnish. Any other suitable base may be used in lieu of the copal varnish. The use of a metallic halide in a varnish which is capable of being rapidly transformed under the action of light as the halogen is liberated is deemed a highly important feature of the invention.

The light-sensitive property of the drying oils has an important bearing in the industries, and the importance is enhanced by the use of suitable accelerators. The invention is useful in the graphic arts, etc., for the production of photoengravings and for all uses in which a strong chemical-resisting coating is required; also in the production of transparent films for one purpose or another, colored, if desired, either in one color or stained in different colors, whether the image to be produced is optically projected directly onto the coating or is printed through a negative. A hitherto unoccupied field is opened through this invention which makes thoroughly practicable the direct projection of the photographic image onto metal, as in half-toning, line etching, etc., directly from an adequately illuminated drawing or transparency. The films produced in the process will be clear, transparent films, elastic, water-proof, non-conducting and highly resistant to chemical solutions and acids, and hence very desirable.

Protection for the light-sensitive varnish which is employed in the present process and the method of making such varnish is being solicited in my co-pending application No. 542,124 filed March 8, 1922.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of photographically reproducing designs, etc., which comprises: covering a desired surface with a spontaneously drying light-sensitive varnish coating, optically projecting an image onto said coating and thus causing the areas under the influence of the projected light to become set, and subsequently developing the coating.

2. The process of optically reproducing designs, etc., which comprises: covering a surface with a coating, comprising a light-sensitive oil, selectively accelerating the hardening action of certain areas by means of light, and subsequently removing the unhardened portions of the coating.

3. The process of optically reproducing designs comprising: projecting an image onto a light-sensitive wet varnish coating and thus selectively hardening portions of the coating, and subsequently removing the other parts of the coating.

4. The process of optically reproducing designs, etc., which comprises: covering a surface with a thin light-sensitive wet varnish coating having a natural characteristic of slowly drying, optically projecting an image onto said wet coating until the portions of the coating acted upon by the light becomes set, and in then developing the image formed in the coating.

5. The process of optically reproducing designs, etc., which comprises: applying a light-sensitive varnish coating comprising a drying oil to a surface, optically projecting an image onto said coating and thus selectively hardening the coating in the portions affected by the projected light, and in subsequently removing the unreacted portions of the coating.

6. The process of optically reproducing designs, etc., which comprises: flowing a light-sensitive varnish onto a suitable surface and thus providing a wet coating thereon, and subjecting certain defined areas of the wet coating to selective changes, affecting the solubility, under the action of a luminous image.

7. The process of etching a surface which comprises: covering the surface with a light-sensitive wet varnish coating which comprises a drying oil, optically projecting an image on the wet coating to selectively affect certain parts thereof and increase the insolubility thereof, applying a solvent and therewith removing the unacted upon parts of the coating, and applying an agent to etch portions of the surface left unprotected by the removal of unreacted portions of the coating.

8. The process of etching which comprises: coating a surface to be etched with a light-sensitive medium comprising a suitable gum and a drying agent, exposing the coated surface to a luminous image and thus setting the coating selectively in accordance with the action of light thereon, subjecting the surface after such exposure to a suitable solvent to remove the unacted upon parts, and thereafter applying an etching medium to effect etching of portions of the surface left unprotected by the removal of portions of the coating.

9. The process of optically reproducing designs, etc., which comprises: applying to a surface a light-sensitive coating which comprises a resin, a natural drying agent and an accelerator, and selectively acting upon said coating with a light image and thus forming a "set" image in the coating.

10. The process of optically reproducing designs, etc., which comprises: applying to a surface a light-sensitive coating comprising a drying oil and an accelerating agent, and selectively acting upon said coating by means of a light image until a "set" image is produced in the coating.

11. The process of optically reproducing designs, etc., which comprises: applying to a surface a light-sensitive coating comprising a varnish having incorporated therein a metallic halide, and subjecting said coating to the selective action of light transmitted through a transparency in accordance with a design on said transparency until portions of the coating affected by the light form a "set" image in the coating.

12. The process of optically reproducing designs, etc., which comprises: subjecting to the selective action of light transmitted through a transparency embodying a design, a light-sensitive coating comprising a resin and a metallic halide incorporated therein as a sensitizer until the portions of the coating affected by the light produce a "set" image in the coating.

13. The process of optically reproducing designs, which comprises: subjecting to the selective action of light transmitted through a transparency embodying a design, a light-sensitive medium comprising a hydrophobic colloid in relatively large proportion and a metallic halide in small proportion until the portions of the coating affected by the light form a "set" image in the coating.

14. The process of optically reproducing designs, etc., which comprises: applying to a surface a varnish comprising a resin, a drying oil employed in larger proportion than the resin, and an accelerator employed in relatively small proportion, and selectively acting upon said coating with light transmitted through a transparency embodying a design until the portions of the coating affected by the light form a "set" image in the coating.

15. The process of optically reproducing designs, etc., which comprises: applying to a surface a coating comprising a resin, a drying oil employed in larger proportion than the resin, and an accelerator comprising a metallic halide, and subjecting the coating to the selective action of light transmitted through a transparency embodying a design until the portions of the coating acted upon by the light form a "set" image in the coating.

16. The process of optically reproducing designs, etc., which comprises: applying to a surface a varnish comprising a resin, tungoil employed in larger proportion than the resin, and an accelerator comprising a metal salt and a halogen, and selectively acting upon said coating with light transmitted through a transparency embodying a design until the portions of the coating affected by the light form a "set" image in the coating.

17. The process of optically reproducing designs, etc., which comprises: forming on a surface a varnish coating comprising a halogen-liberating accelerator and a body comprising constituents adapted to become "set" under the action of liberated halogen, and selectively acting upon said coating with light transmitted through a transparency embodying a design until the portions of the coating affected by the light form a set image in the coating.

18. The process of optically reproducing designs, etc., which comprises: transmitting light through a transparency embodying a design upon a coating comprising a halogen-liberating agent and a medium containing constituents transformable by liberated halogen, until the portions of the coating under the influence of light form a set image in the coating.

In testimony whereof I affix my signature.

MURRAY C. BEEBE.